US00RE51130E

(19) United States
(12) Reissued Patent
Zhao

(10) Patent Number: US RE51,130 E
(45) Date of Reissued Patent: Nov. 24, 2026

(54) BABY GYM

(71) Applicant: Lei Zhao, Ningbo (CN)

(72) Inventor: Lei Zhao, Ningbo (CN)

(21) Appl. No.: 30/011,522

(22) Filed: Jul. 3, 2025

Related U.S. Patent Documents

Reissue of:
(64) Patent No.: Des. 990,927
Issued: Jul. 4, 2023
Appl. No.: 29/839,380
Filed: May 20, 2022

(51) LOC (15) Cl. ..... 06-13
(52) U.S. Cl.
USPC ..... D6/596
(58) Field of Classification Search
USPC ..... D6/596, 595, 597, 598, 601; D21/419, D21/465, 474, 476
CPC ..... A47G 9/00; A47G 9/062; A47G 9/083; A47G 9/1027; A47G 2009/003; A47C 23/00; A47C 27/081; A47C 27/05; A47C 27/002; A47D 13/06; A47D 13/063; A47D 15/003
See application file for complete search history.

(56) References Cited

U.S. PATENT DOCUMENTS

D316,648 S * 5/1991 McHale ..... D6/596
5,059,463 A * 10/1991 Peters ..... A47G 9/06 135/116
D330,139 S 10/1992 Bloom ..... 5/655
(Continued)

FOREIGN PATENT DOCUMENTS

WO WO-DM097542 7/2017
WO D097542 * 9/2017

OTHER PUBLICATIONS

Gooole Term Search: 'baby gym', [site visited Apr. 22, 2023]<URL: https://www.google.com/search?q=baby=gym&sxsrf=APwXEdc80Egqneu4YZg8w6HdrIOKWhN3qw:1682214705309&source=Inms&tbm=isch&sa=X&ved=2ahUKEwjUmsiP8r7-AhUNKFkFHVygB_gQ0pQJegQIJBAG&biw=1200&bih=1777&dpr=1> (Year: 2023).*

*Primary Examiner* — Philip S Hyder
(74) *Attorney, Agent, or Firm* — Osha Bergman Watanabe & Burton LLP

(57) CLAIM

The ornamental design for a baby gym, as shown and described.

DESCRIPTION

FIG. 1 is a top front right perspective view of a baby gym in accordance with the new design.
FIG. 2 is a top plan view thereof.
FIG. 3 is a bottom plan view thereof.
FIG. 4 is a front and rear elevation view thereof.
FIG. 5 is a left and right elevation view thereof.
FIG. 6 is a top front right perspective view thereof with its edge folded.
FIG. 7 is a top front right perspective view thereof without the bars.
FIG. 8 is a top plan view thereof without the bars.
*FIG. 9 is a top front right perspective view thereof with its edge unfolded and without the bars.*
*FIG. 10 is a top plan view of FIG. 9.*
*FIG. 11 is a front and rear elevation view of FIG. 9.*
*FIG. 12 is a left and right elevation view of FIG. 9.*
*FIG. 13 is a top front right perspective view of only the bars.*
*FIG. 14 is a top plan view of FIG. 13.*
*FIG. 15 is a front and rear elevation view of FIG. 13; and,*
*FIG. 16 is a left and right elevation view of FIG. 13.*
*The broken lines depict portions of the baby gym that form no part of the claimed design.*

1 Claim, 16 Drawing Sheets

Figure 1:
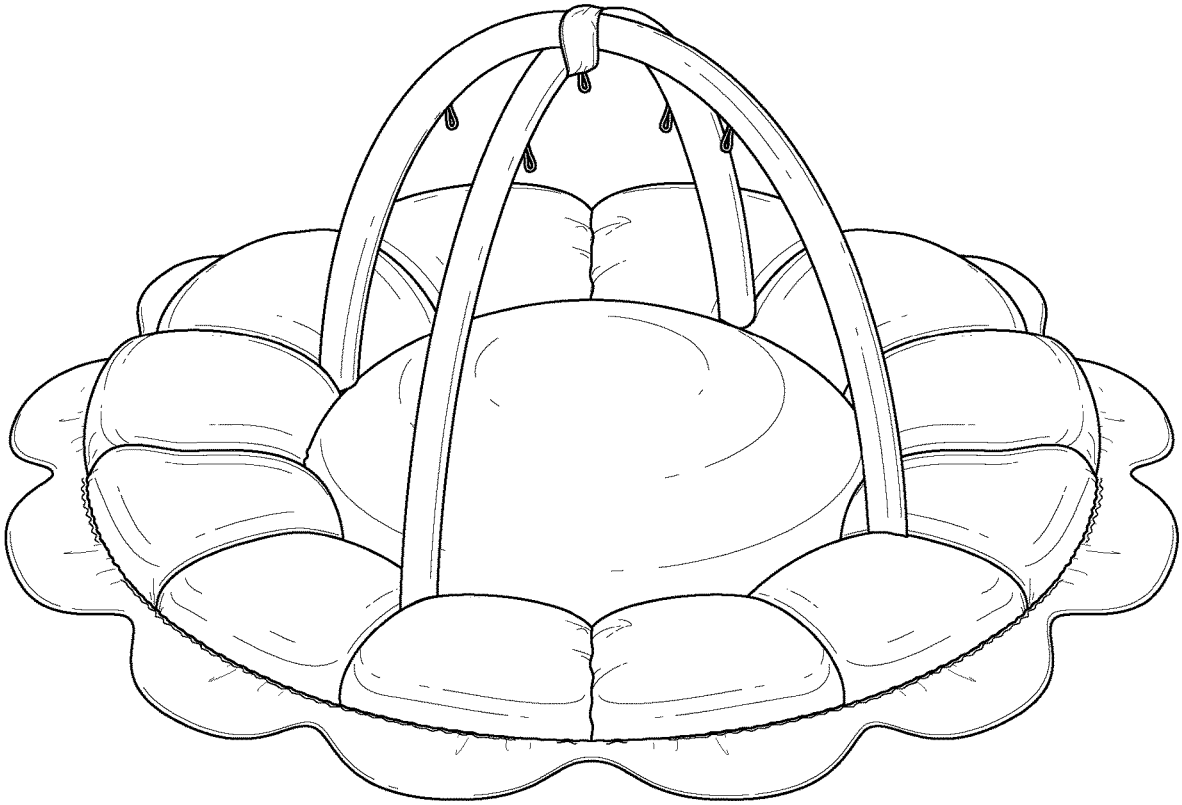
Figure 2:
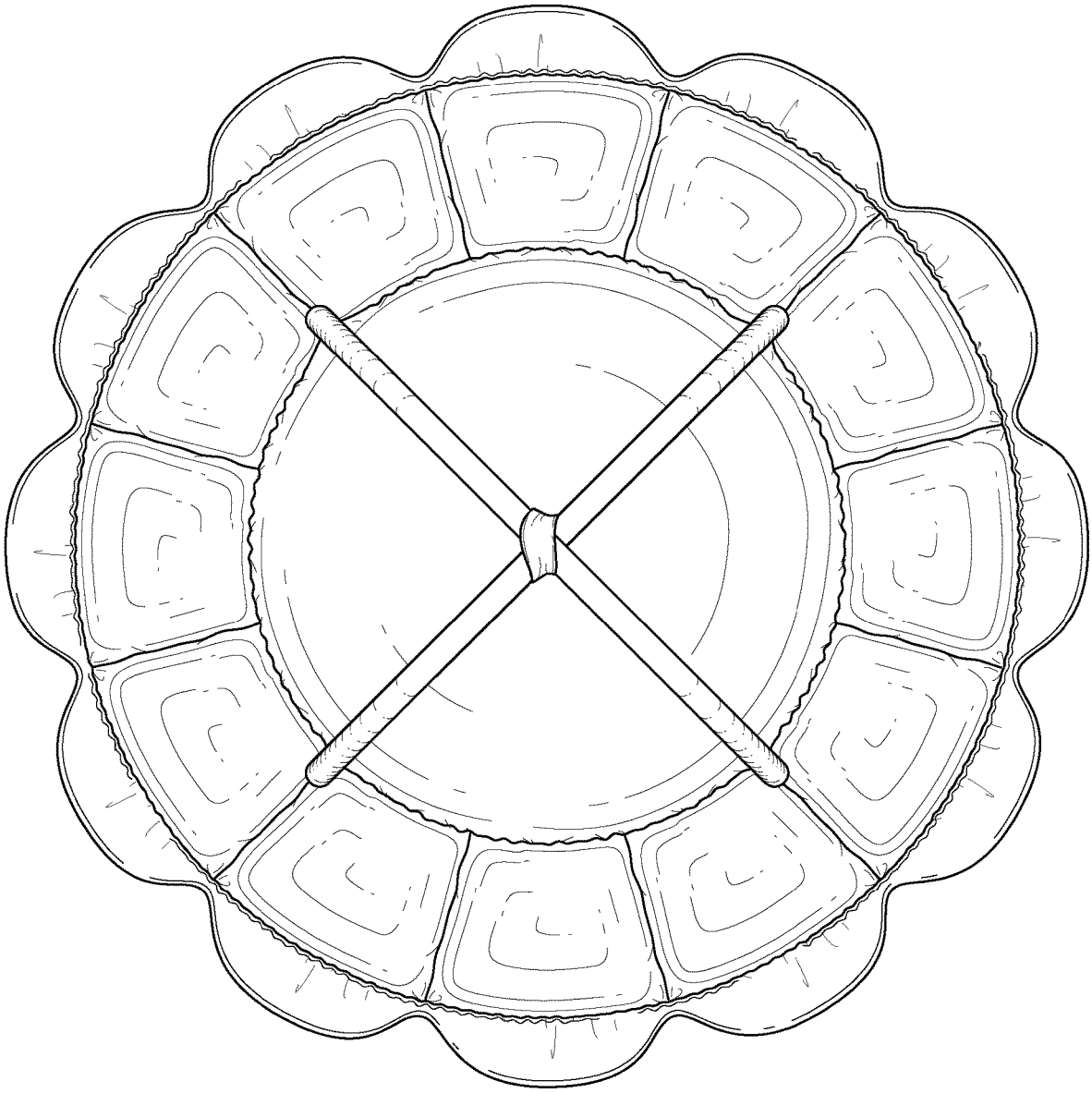
Figure 3:
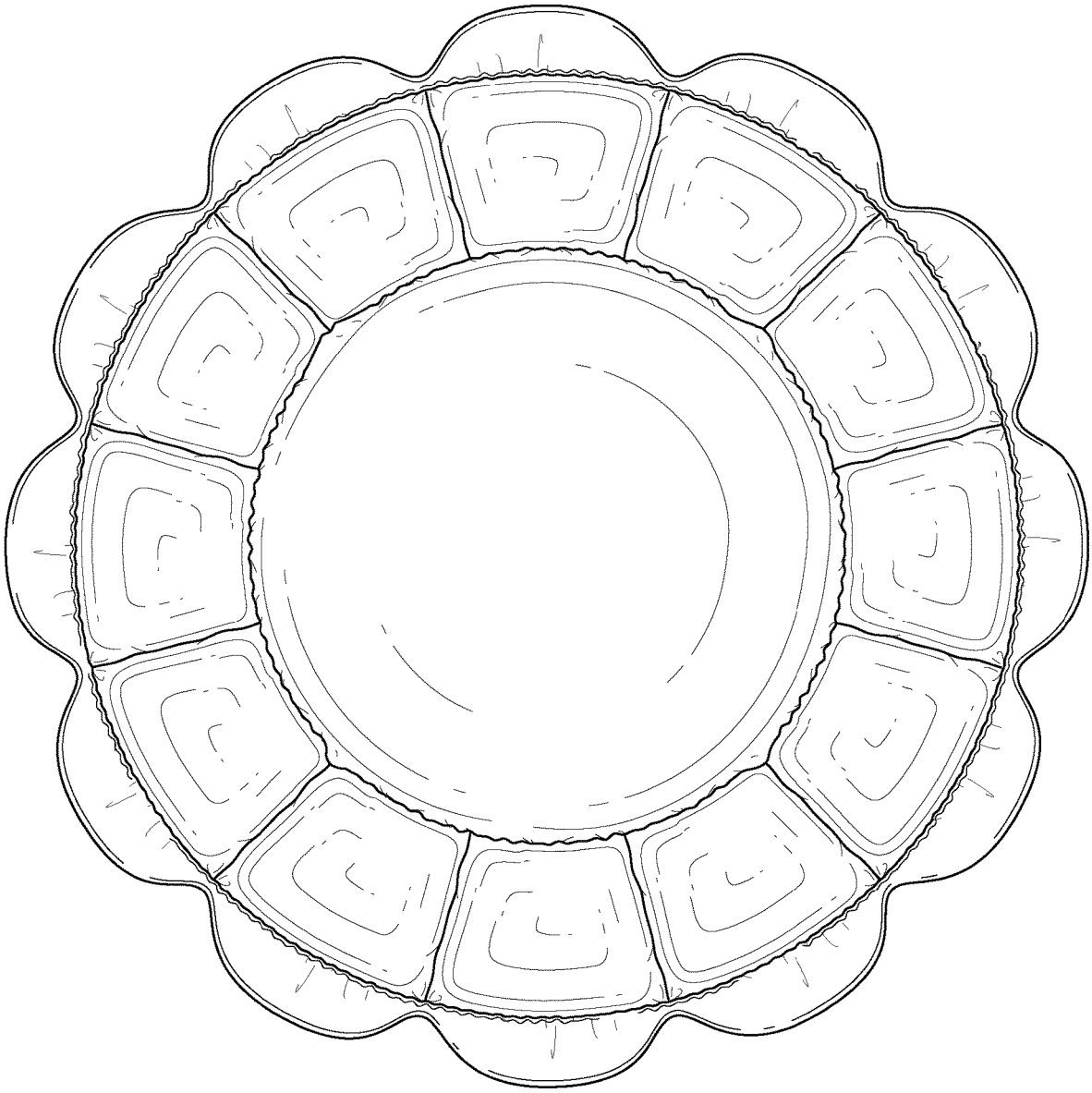
Figure 4:
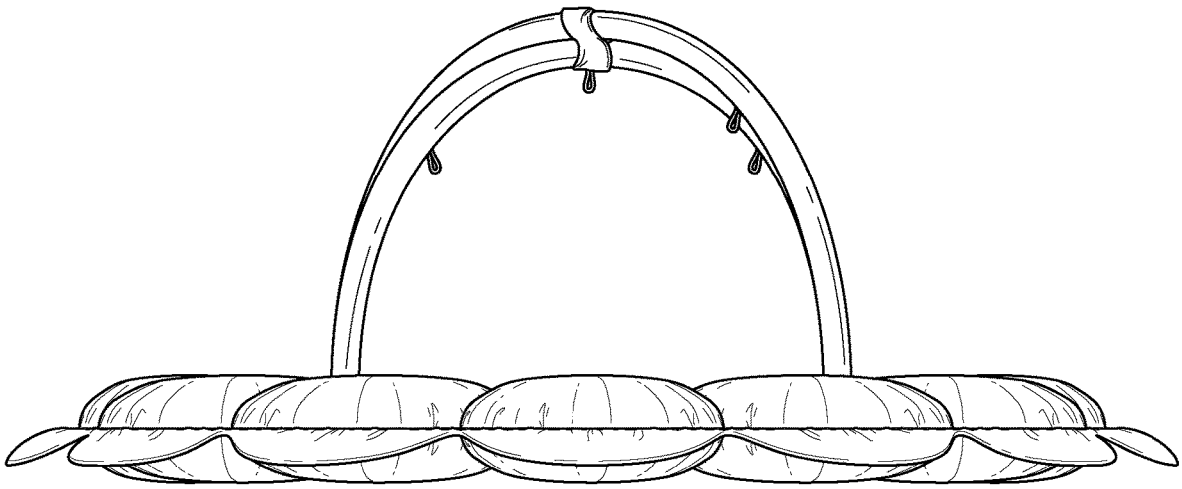
Figure 5:
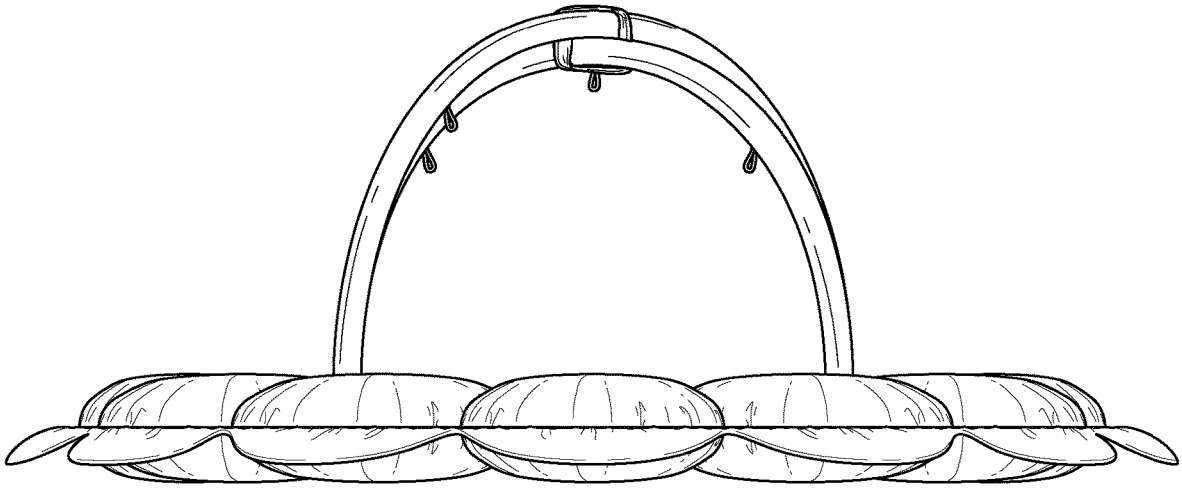
Figure 6:
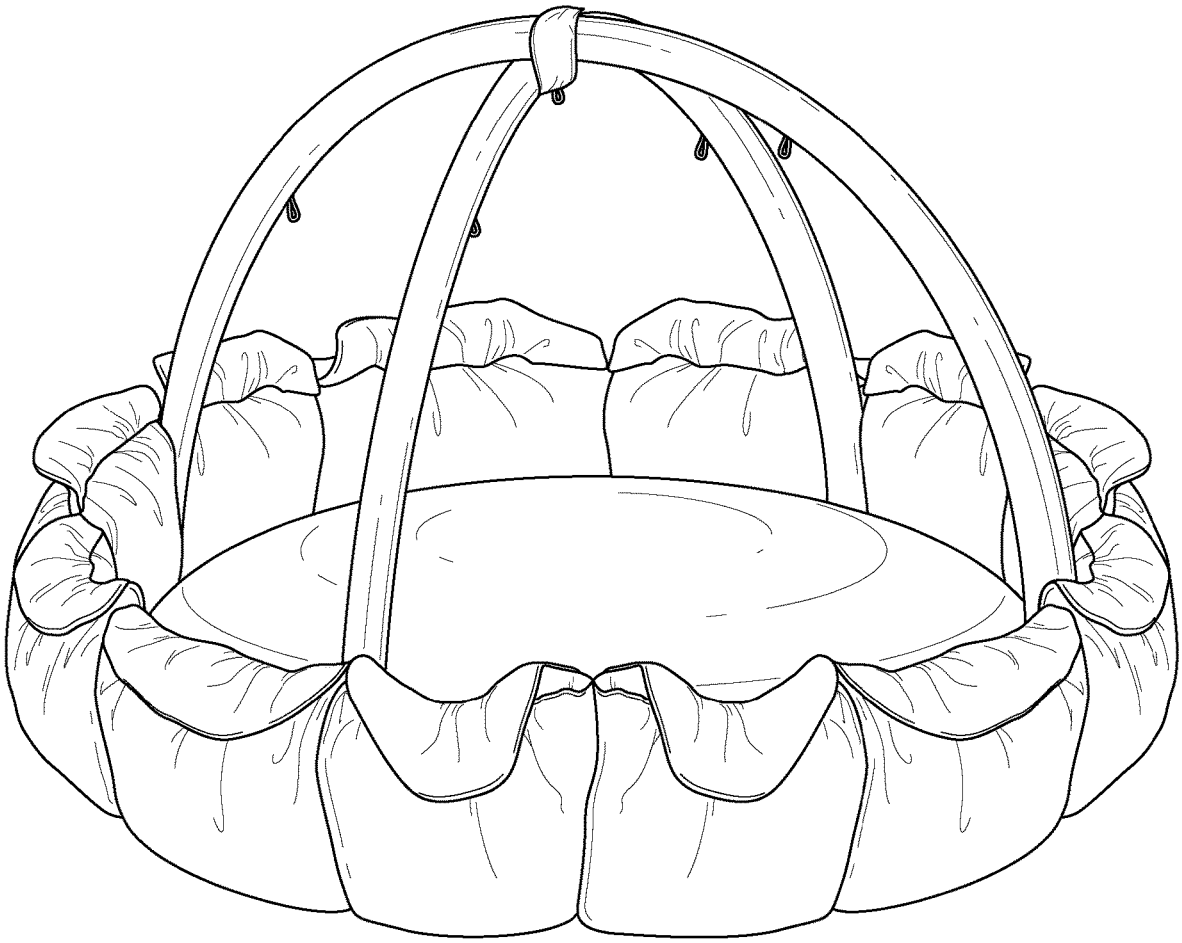
Figure 7:
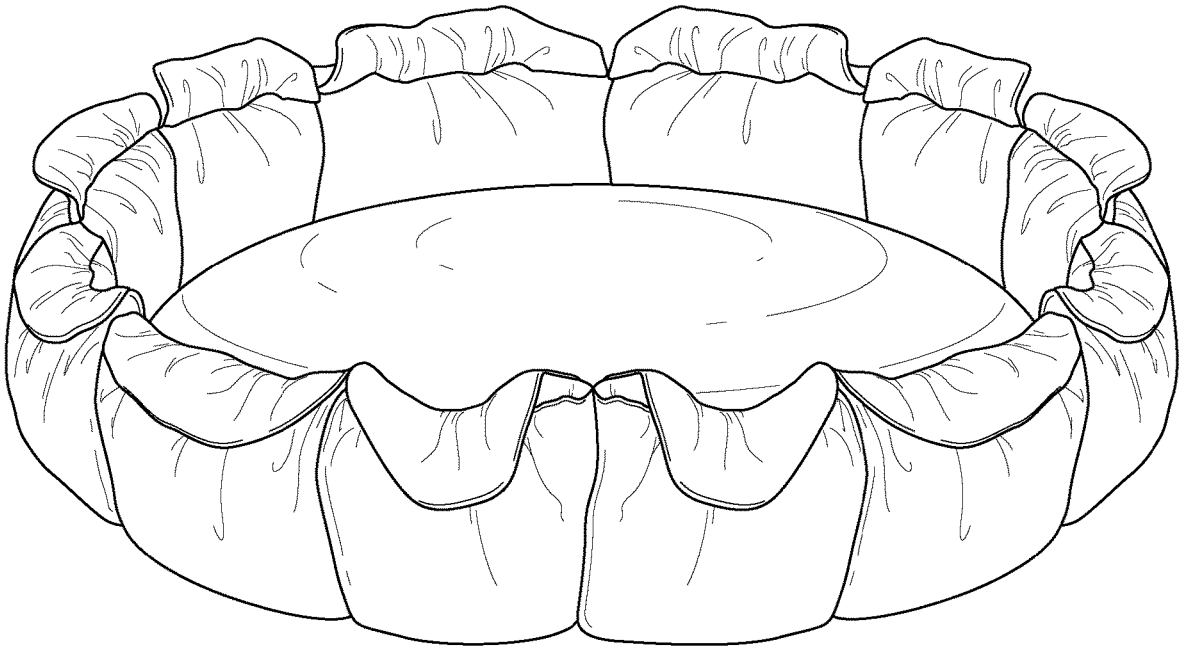
Figure 8:
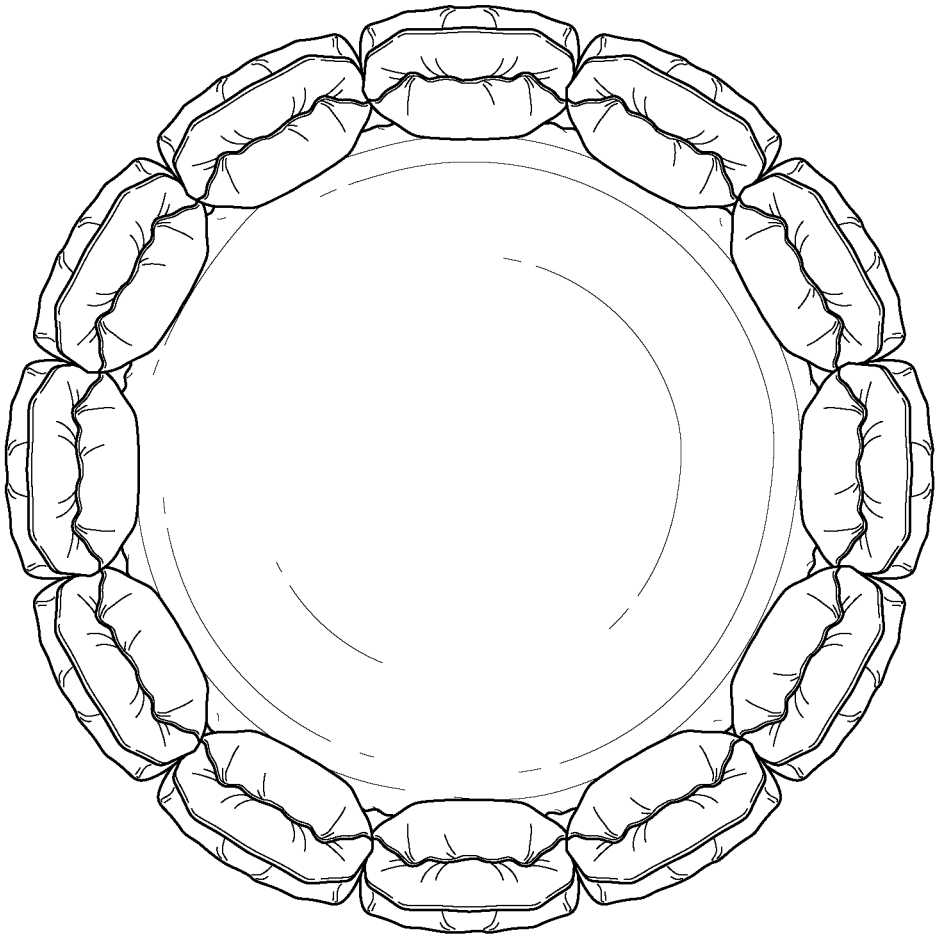

Matter enclosed in heavy brackets [ ] appears in the original patent but forms no part of this reissue; matter printed in italics indicates the additions made by reissue.

(56) References Cited

U.S. PATENT DOCUMENTS

D347,329 S 5/1994 Wilkins
D353,073 S * 12/1994 Birk ..... D6/601
D359,869 S * 7/1995 Oren ..... 5/655
D408,192 S * 4/1999 Chiang ..... 5/655
D427,250 S * 6/2000 Chan ..... D30/118
6,357,462 B1 * 3/2002 Laosunthara ..... A47D 15/003 5/99.1
6,702,643 B1 * 3/2004 Drosendahl ..... A63H 33/006 446/175
7,037,170 B2 * 5/2006 Pacella ..... A63H 33/006 446/268
D532,239 S * 11/2006 Oren ..... D6/596
D547,993 S * 8/2007 Oren ..... D6/582
7,302,724 B2 * 12/2007 Solomon ..... A47D 15/003 5/655
7,376,993 B2 * 5/2008 Myers ..... A47D 13/066
7,490,379 B2 * 2/2009 Solomon ..... A47D 15/003 5/655
D626,755 S * 11/2010 Spitz ..... D6/331
D652,180 S * 1/2012 Haaf ..... D21/465
D653,005 S * 1/2012 Haaf ..... D21/465
D660,634 S * 5/2012 Papp ..... D6/602
8,430,711 B2 * 4/2013 Chininis ..... A63H 33/006 446/236
8,460,053 B2 * 6/2013 Fair ..... B62B 9/26 5/655
D707,779 S 6/2014 Elson
8,864,547 B2 * 10/2014 Elson ..... A63H 33/006 446/227
8,920,208 B2 * 12/2014 Elson ..... A63H 33/006 5/655
8,968,048 B2 * 3/2015 Oren ..... A47D 13/00 5/655
D808,180 S 1/2018 Mastrosimone-Gese et al.
D818,543 S * 5/2018 Zanger ..... D21/475
D834,857 S * 12/2018 Peterson ..... D6/596
D854,859 S 7/2019 Rolph et al.
D862,913 S * 10/2019 Jin ..... D6/331
D919,334 S * 5/2021 Beamen ..... D6/608
D931,653 S * 9/2021 Sun ..... D6/607
D932,782 S 10/2021 Kong
D975,789 S * 1/2023 Xu ..... D21/475
D975,790 S * 1/2023 Xu ..... D21/475
D988,424 S * 6/2023 Chen ..... D6/597
D991,361 S * 7/2023 Huang ..... D21/475
2001/0003695 A1 * 6/2001 Tell ..... A63H 33/006 446/227
2004/0266312 A1 * 12/2004 Oren ..... A63H 33/006 446/227
2006/0253987 A1 * 11/2006 Solomon ..... A47D 15/003 5/655
2007/0204405 A1 * 9/2007 Solomon ..... A47D 15/003 5/655
2009/0253342 A1 * 10/2009 Oren ..... A47D 15/003 5/655
2011/0065353 A1 * 3/2011 Chininis ..... A63H 33/006 446/227
2013/0065480 A1 * 3/2013 Elson ..... A63H 33/006 446/227
2016/0101369 A1 * 4/2016 Austern ..... A63H 33/006 446/227
2019/0099685 A1 * 4/2019 Rolph ..... A63H 33/006
2020/0022506 A1 * 1/2020 Mastrosimone-Gese ..... A47D 15/003
2022/0249969 A1 * 8/2022 Weiss ..... A63H 23/10

* cited by examiner

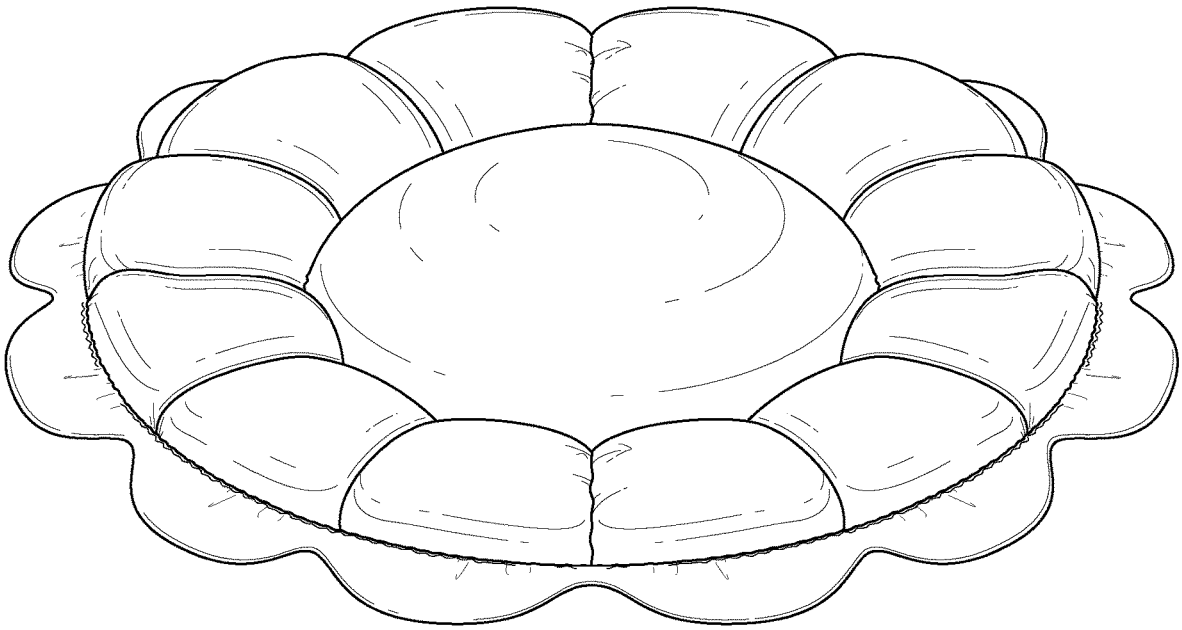
FIG. 9
New

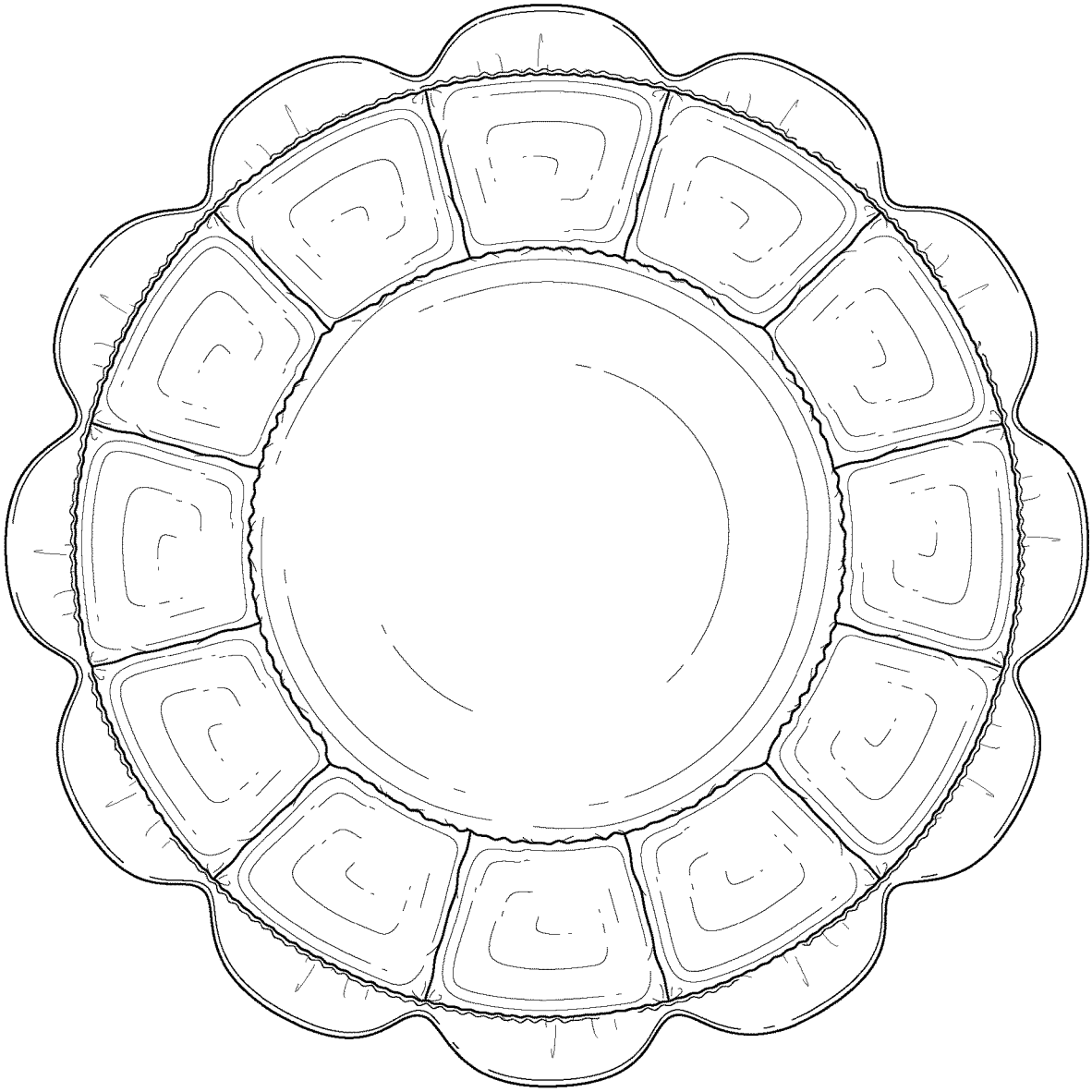
FIG. 10
New

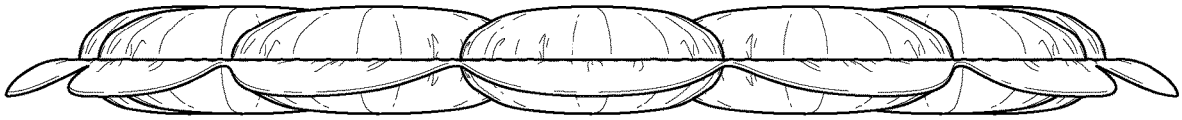
FIG. 11
New

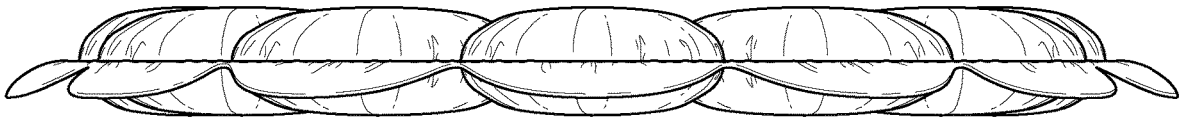
FIG. 12
New

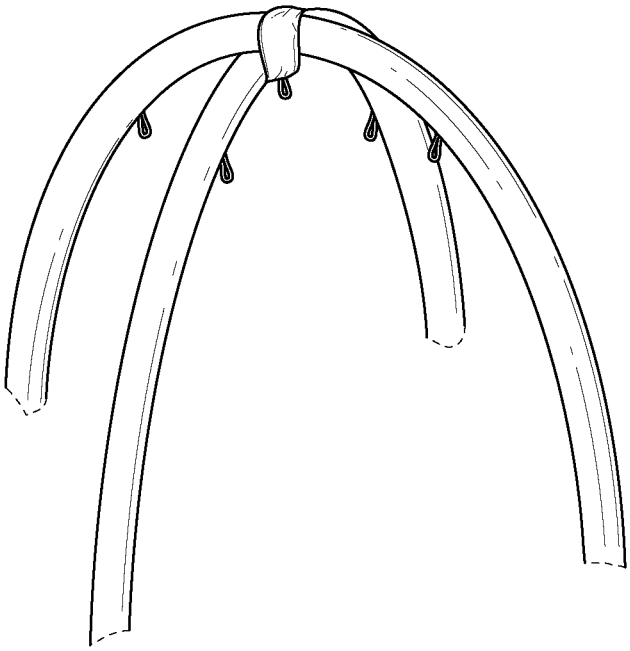
FIG. 13
New

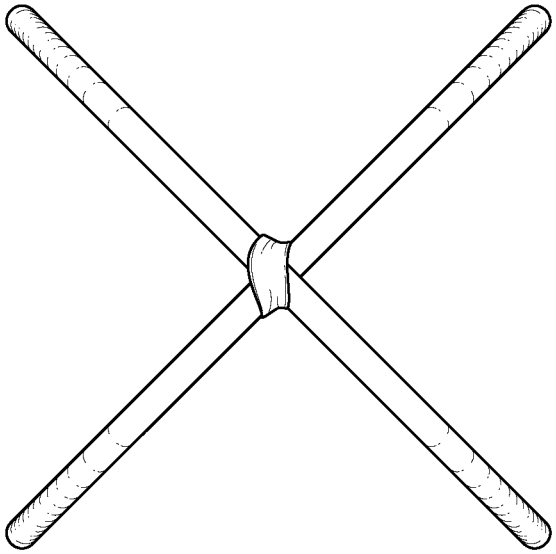
FIG. 14
New

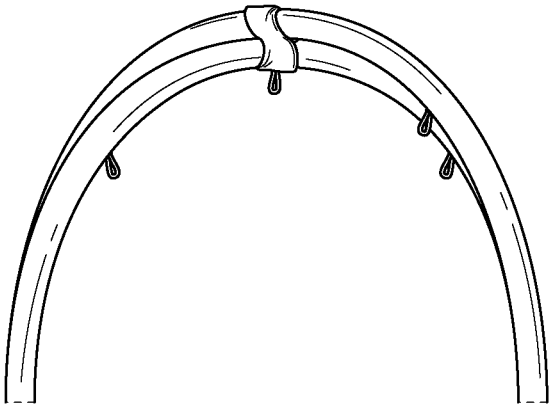
FIG. 15
New

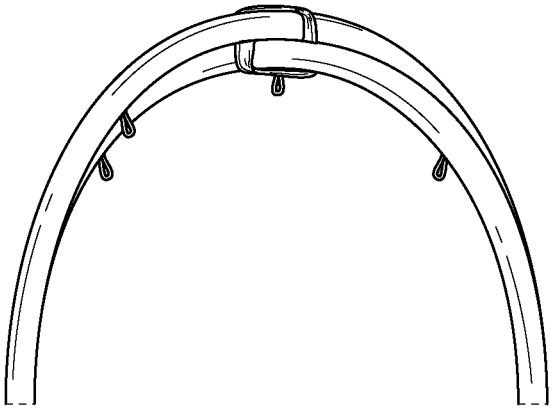
FIG. 16
New